United States Patent
Myers

(10) Patent No.: US 8,650,272 B2
(45) Date of Patent: Feb. 11, 2014

(54) DISTRIBUTED TRANSACTION PROCESSING SYSTEM HAVING RESOURCE MANAGERS THAT COLLABORATE TO DECIDE WHETHER TO COMMIT OR ABORT A TRANSACTION IN RESPONSE TO FAILURE OF A TRANSACTION MANAGER

(75) Inventor: Douglas B. Myers, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1070 days.

(21) Appl. No.: 12/238,779

(22) Filed: Sep. 26, 2008

(65) Prior Publication Data

US 2010/0017642 A1 Jan. 21, 2010

Related U.S. Application Data

(60) Provisional application No. 61/081,068, filed on Jul. 16, 2008.

(51) Int. Cl.
*G06F 15/173* (2006.01)

(52) U.S. Cl.
USPC ........... 709/223; 709/224; 709/226; 718/101; 718/104

(58) Field of Classification Search
USPC .................................. 709/223–226; 718/104
See application file for complete search history.

(56) References Cited

U.S. PATENT DOCUMENTS

| | | | | | |
|---|---|---|---|---|---|
| 5,247,608 | A | * | 9/1993 | Flemming et al. | 700/255 |
| 5,347,459 | A | * | 9/1994 | Greenspan et al. | 700/255 |
| 5,561,742 | A | * | 10/1996 | Terada et al. | 700/255 |
| 6,463,456 | B1 | * | 10/2002 | Kan et al. | 709/201 |
| 6,631,425 | B1 | * | 10/2003 | Helland et al. | 719/332 |
| 7,206,805 | B1 | * | 4/2007 | McLaughlin, Jr. | 709/203 |
| 2002/0194242 | A1 | * | 12/2002 | Chandrasekaran et al. | 709/101 |
| 2003/0100957 | A1 | * | 5/2003 | Chaffee et al. | 700/18 |
| 2005/0262182 | A1 | * | 11/2005 | Thole | 709/200 |
| 2006/0075277 | A1 | * | 4/2006 | Johnson et al. | 714/4 |
| 2007/0072163 | A1 | * | 3/2007 | Groff et al. | 434/322 |
| 2008/0250074 | A1 | * | 10/2008 | Parkinson | 707/200 |
| 2009/0235255 | A1 | * | 9/2009 | Hu et al. | 718/101 |

OTHER PUBLICATIONS

Wikipedia, definition for "three-phase commit protocol," http://en.wikipedia.org/wiki/Three-phase_commit_protocol, pp. 1-3 (at least as early as Apr. 11, 2008).

S.R. Gaddam, "Three-Phase Commit Protocol," http://ei.cs.vt.edu/~cs5204/fall99/distributedDBMS/sreenu/3pc.html, pp. 1-5 (at least as early as Apr. 11, 2008).

X/Open Company Limited, X/Open CAE Specification, Distributed Transaction Processing: The XA Specificiation, pp. 1-80 (Dec. 1991).

* cited by examiner

*Primary Examiner* — Mohamed Ibrahim

(57) ABSTRACT

A distributed transaction processing system includes a plurality of resources, resource managers to manage corresponding ones of the resources, and a transaction manager to coordinate performance of a transaction with the resource managers. In response to failure of the transaction manager, the resource managers are configured to collaborate to decide whether to commit or abort the transaction.

20 Claims, 6 Drawing Sheets

DISTRIBUTED TRANSACTION PROCESSING SYSTEM HAVING RESOURCE MANAGERS THAT COLLABORATE TO DECIDE WHETHER TO COMMIT OR ABORT A TRANSACTION IN RESPONSE TO FAILURE OF A TRANSACTION MANAGER

CROSS REFERENCE TO RELATED APPLICATIONS

This Application claims the benefit of provisional patent application Ser. No. 61/081,068, filed 16 Jul. 2008, titled "Distributed Transaction Processing System Having Resource Managers That Collaborate To Decide Whether To Commit Or Abort A Transaction In Response To Failure Of A Transaction Manager", which application is incorporated by reference herein as if reproduced in full below.

BACKGROUND

A distributed transaction processing system is a system in which a transaction is processed across multiple resources of the system. Examples of resources include storage subsystems, database management subsystems, and so forth.

A distributed transaction processing system typically includes a transaction manager that is responsible for coordinating a transaction that is performed across multiple resources. The transaction manager is also responsible for transaction completion (committing a transaction or aborting a transaction) and failure recovery. However, if the transaction manager were to crash for any reason, then any outstanding transaction that is managed by the transaction manager would remain active until the transaction manager comes back up and is able to provide instructions on how to complete the transaction. In the meantime, however, various resources may be locked while the transaction manager is down, which can potentially block other transactions from accessing or modifying such locked resources. If the transaction manager is stopped for a relatively long period of time (e.g., hours or even days), then processing of other transactions can be adversely affected.

BRIEF DESCRIPTION OF THE DRAWINGS

Some embodiments of the invention are described with respect to the following figures.

DETAILED DESCRIPTION

A distributed transaction processing system includes multiple resources and resource managers to manage the corresponding resources. Examples of resources include storage subsystems (e.g., cells of storage devices), database management subsystems, and so forth. A resource manager manages the usage of the corresponding resource. The resource managers cooperate with a transaction manager in the distributed transaction processing system to perform a transaction that involves multiple ones of the resources.

In accordance with some embodiments, the resource managers are able to complete a transaction in response to failure of the transaction manager. A transaction is a unit of work that may include several computational tasks. A transaction can be committed (in other words, the transaction can complete without failure), or the transaction may be rolled back (aborted due to some failure of the transaction) to a prior state. Failure of the transaction manager refers to either the transaction manager crashing or otherwise failing, or to failure of a network between the transaction manager and the resource managers that prevents communication between the transaction manager and resource managers. In the latter case, even though the transaction manager may be operational, failure of the network between the transaction manager and the resource managers is detected by the resource managers as a failure of the transaction manager. Thus, "failure of a transaction manager" refers to either actual failure of the transaction manager, or failure of communication between the transaction manager and resource managers due to a network problem. Since the resource managers are able to complete a transaction (or transactions) even though a transaction manager has failed, the failure of the transaction manager does not cause extended periods during which resources are being locked while the transaction manager is down.

Figure 1:
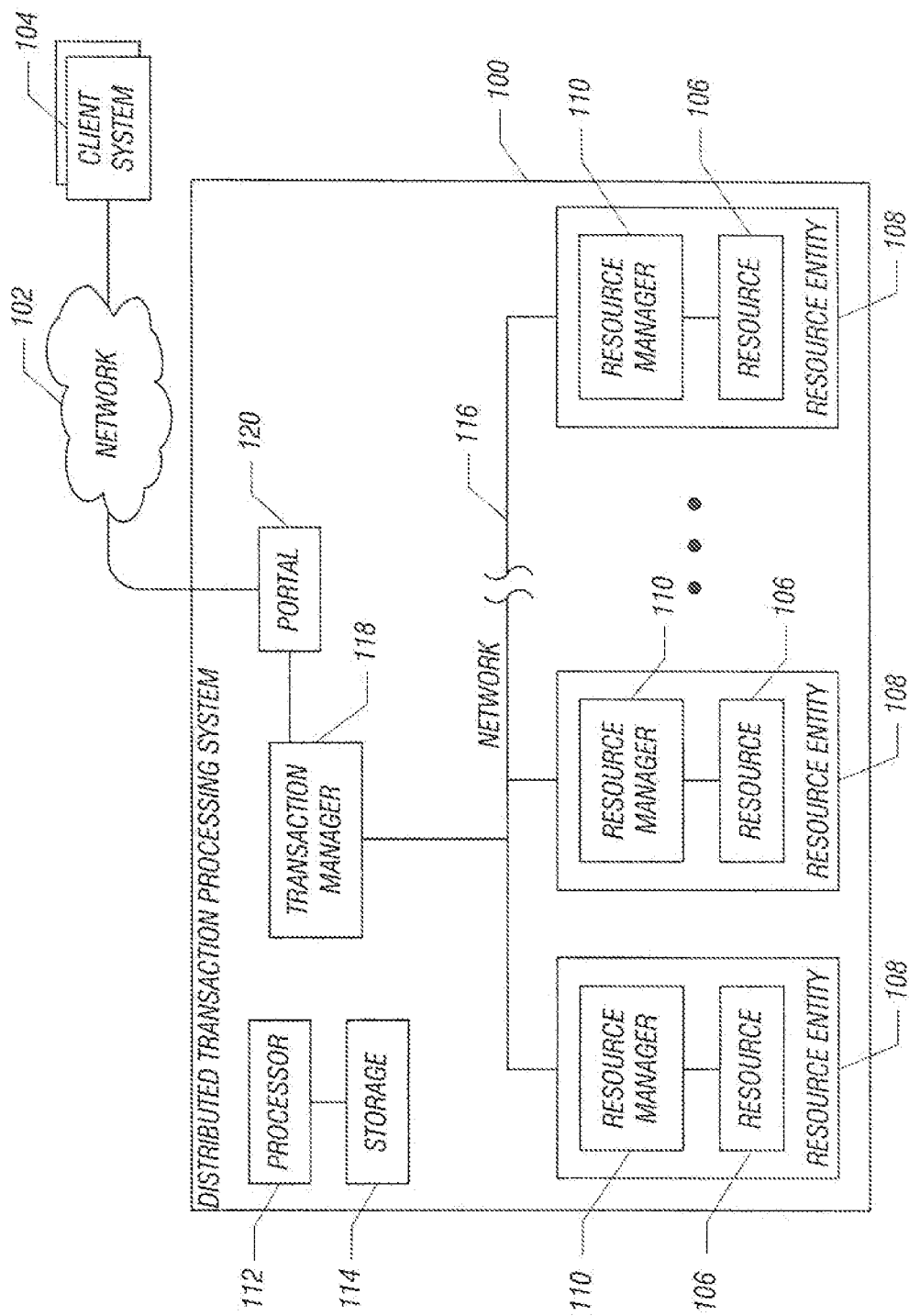
FIG. 1 is a block diagram of an exemplary distributed transaction processing system that has multiple resources and associated resource managers, in which an embodiment of the invention can be incorporated.

FIG. 1 illustrates an exemplary arrangement that includes a distributed transaction processing system 100 that is coupled over a network 102 to one or more client systems 104 that are able to submit requests to the distributed transaction processing system. In one example, the distributed transaction processing system can be an archival system that has a number of storage cells (example of resources 106) that are used to archive data of an enterprise (e.g., company, educational organization, government agency, etc.). Alternatively, the distributed transaction processing system 100 can be a database management system, with the resources 106 being different database subsystems of the distributed database management system. It is noted that other arrangements of the transaction processing system 100 are possible in alternative implementations.

The resources 106 are part of resource entities 108 that further include corresponding resource managers 110 for managing access and other tasks of the resources 106. The resource managers 110 can be software modules executable on one or more processors 112 in the distributed transaction processing system 100. The one or more processors 112 are connected to storage 114, which can be system memory (implemented with non-persistent memory such as dynamic random access memories) or persistent storage such as disk-based storage.

The resource entities 108 are interconnected by a network 116, which can be a bus, storage area network, local area network, or any other type of communication link.

A transaction manager 118 (which can also be a software module) is able to communicate with the resource managers 110 over the network 116. Although just one transaction manager 118 is depicted in FIG. 1 it is noted that multiple transaction managers can be provided in other embodiments. The transaction manager 118 coordinates the management of a transaction that is handled by more than one resource manager 110. The transaction that is handled by multiple resource managers 110 is also referred to as "global transaction." The transaction manager 118 assigns identifiers to global transactions and acts as the coordinator in a two-phase commit protocol. A two-phase commit protocol is a protocol to allow multiple entities involved in a transaction to commit the transaction. If the multiple entities are unable to agree to commit the transaction, then the transaction is aborted by the entities.

The two-phase commit protocol provides two phases to complete a transaction: (1) a prepare phase to prepare resource managers to commit; and (2) a commit phase to commit the transaction. Alternatively, techniques according to some embodiments can be applied to other protocols aside from the two-phase protocol.

In accordance with some embodiments, rather than the transaction manager 118 being responsible for transaction completion or failure recovery, the resource managers 110 take responsibility (in response to a detected transaction manager failure) to ensure that all resource managers deal with a transaction in a consistent manner. This allows the resource managers 110 to complete a transaction even in the presence of failure of the transaction manager 118 (either the transaction manager 118 crashing or the network 116 failing). The resource managers 110 that are involved in the transaction are able to communicate with each other to handle completion of the transaction in a consistent manner (either committing or aborting).

The resource managers 110 collaborate to determine whether to commit or abort a transaction. Each resource manager 110 persistently keeps track (by storing information, such as a persistent log, in persistent storage) of what actions the resource manager took for each transaction that the resource manager participated in for as long as that information may have to be used for the purpose of recovery by the resource managers involved in the transaction. Once all the resource managers involved in the transaction successfully complete the transaction, then all the resource managers involved in the transaction can "forget" about that transaction, which means that the resource managers can delete such information (e.g., delete the persistent log). In accordance with some embodiments, such paradigm implements a three-phase commit protocol, where the first two phases are the same as the two-phase commit protocol, and the third phase is a clean-up phase where each resource manager is notified that the resource manager can now forget about the transaction.

The distributed transaction processing system 100 also includes a portal 120 that is able to receive requests from client systems 104. The portal 120, in response to a client request, can decide which resource entities 108 are involved in a transaction corresponding to the client request. Note that multiple portals can be presented in the system 100.

Under normal conditions, when there are no failures or timeouts, the resource managers involved in a transaction still take direction from the transaction manager 118, which coordinates the three-phase commit protocol (two-phase commit plus clean-up phase). The resource managers 110 only take independent action in the case of a timeout or when a resource manager is recovering from a failure. A timeout would be expected if the transaction manager 118 fails, or if a network failure prevents the transaction manager from communicating to the resource manager within the timeout period, or if some resource manager involved in a transaction fails.

A timeout is purely time based and will occur after a period of time if the transaction manager does not call the resource manager first. The timeout period is set such that the transaction manager should call the resource manager before the timeout occurs if the transaction manager is operating normally. In the case of a transaction manager failure, the timeout will occur, but there may be exceptional times when the timeout occurs before the transaction manager calls the resource due to the transaction manager call being delayed due to slow performance of the transaction manager or the network between the transaction manager and the resource manager. In this case the resource manager may act upon receiving a timeout without the transaction manager actually being down. This scenario is described in connection with FIG. 6 below.

Each resource manager 110 is configured with a timeout period specifying how long the resource manager is to wait before taking action on its own for a particular transaction. This timeout period can be different for each transaction. The timeout period is communicated to each resource manager 110 by the transaction manager 118 at the time the resource manager is associated with the transaction The timeout period used by the resource manager should be at least as long as the timeout period for the transaction, but in practice it should be longer since the transaction manager 118 should be given the opportunity to coordinate a transaction abort if a transaction timeout occurs. In practice, the resource managers should only take independent action when communication breaks down between the transaction manager and the resource managers due to a network problem or due to either the transaction manager or a resource manager failing.

Each resource manager 110 is informed by the transaction manager 118 of what other resource managers are involved in a given transaction, so that each resource manager can collaborate with the other involved resource managers to determine a recovery action in response to a failure. The identities of resource managers involved in a transaction are communicated to each resource manager by the transaction manager at the start of the prepare phase through the prepare call. The "prepare phase" refers to a prepare to commit phase, which is started by the transaction manager 118 sending a message to resource managers involved in a transaction that the resource managers should start to prepare to commit the transaction. The "prepare call" refers to the transaction manager sending the prepare message to the resource managers to perform the preparation for committing the transaction.

In one embodiment, each resource manager 110 is driven by its own timeouts in the absence of communication from the transaction manager 118 and will only act on its own resources. No resource manager will act as a transaction coordinator.

If a resource manager 110 receives a timeout for a transaction before it receives a call to prepare from the transaction manager 118, then the resource manager 110 will abort the transaction. If the resource manager 110 receives the call to prepare from the transaction manager 118 after it has already started aborting the transaction due to the timeout, then the resource manager should respond to the transaction manager with an exception indicating that the transaction was aborted after finishing aborting the transaction.

A resource manager should disable its timeout once it starts the prepare phase. Any timeout that occurs during this phase is ignored. At the end of the prepare phase, the resource manager again resets the timeout so that if the transaction manager 118 fails to call the resource manager to commit or abort the transaction, the resource manager can eventually itself initiate the commit phase of the transaction.

If a resource manager 110 receives a timeout for a transaction after it responds to the call to prepare, but before receiving the call to commit, it will need to call the other resource managers involved in the transaction to determine whether to commit or abort. A "call to commit" refers to a message sent by the transaction manager to commit the transaction. The call to commit occurs after the prepare call.

In the latter scenario above (the resource manager has responded to the prepare call but has not yet received a commit call from the transaction manager), the resource manager determines whether to commit or abort a transaction based on the following factors:

If there are no other resource managers, this resource manager can abort the transaction.

If any of the other resource managers has already started to commit or has finished committing the transaction, then this resource manager also commits the transaction.

If any of the other resource managers has already started to abort or has finished aborting the transaction, then this resource manager also aborts the transaction.

If any of the resource managers have not yet finished preparing, then this resource manager aborts the transaction.

If all of other resources are in the same prepared state, then the resource manager can abort the transaction.

If none of the above conditions apply because some resource managers cannot be reached, and the rest are in the prepared state, then this resource manager waits for another timeout period and checks again.

In many cases, a resource manager does not have to contact every other resource manager. As soon as any of the above conditions are satisfied, the resource manager can take action.

Whenever a resource manager contacts another resource manager to query the state of a transaction, each resource manager contacted sets a flag indicating that the transaction may be aborted. After this point, if the transaction manager calls the resource manager to commit the transaction, the resource manager still has to contact the other resource managers to confirm that it is proper to do so. Thus, once the recovery process is started due to a timeout, the resource managers may overrule the decision of the transaction manager to commit. In such a case, the resource manager returns an exception to the transaction manager indicating that the transaction was aborted rather than committed. The transaction manager should receive a similar exception from each resource manager. If so, the transaction manager will also return an exception to a requesting application indicating that the transaction was aborted. The requesting application is the application that submitted the request to initiate the transaction.

A resource manager should disable its timeout once it starts a commit phase (either committing or aborting the transaction). Any timeout that occurs during this phase is ignored.

If the commit phase was initiated by a call from the transaction manager 118 (either to commit or abort the transaction), then at the end of the commit phase, the resource manager again resets the timeout so that if the transaction manager 118 fails to call the resource manager to forget about the transaction, the resource manager can eventually itself initiate the forget procedure (to delete information stored in persistent storage about the transaction). In this case, when a resource manager gets a timeout after the commit phase, the resource manager again has to contact the other resource managers to determine whether it is safe to forget the transaction.

If the commit phase was initiated by a timeout, then at the end of the commit phase, the resource manager can immediately check to see if it can forget about the transaction by contacting the other resource managers as necessary. If it can forget about the transaction, it does so. If not, then it resets the timeout to check again later.

The resource manager considers the following to determine whether or not to forget a transaction:

If no other resource manager is involved in this transaction, forget the transaction.

If any resource manager has already forgotten about the transaction, forget the transaction.

If all the resource managers have already completed the transaction (COMMITED or ROLLED BACK state) or are in the process of completing the transaction (COMMITTING or ROLLING BACK state), forget the transaction.

Otherwise, wait for another timeout period and check again.

In the case where the transaction manager 118 stays up, but one or more resource managers go down to prevent the global transaction from being completed, the transaction manager 118 will go through the first two phases (prepare phase followed by commit phase) as would normally be performed following a standard two-phase commit protocol. If the transaction manager 118 detects the failed resource manager(s) during the prepare phase, the transaction manager would abort the transaction, and would call each resource manager that can be called to abort. If the transaction manager 118 had already decided to commit the transaction before detecting the failed resource, the transaction manager would continue to call each resource manager that can be called to commit. If there are any resource managers that failed to commit or abort the transaction, then the transaction manager will skip the third phase, the clean-up phase, and will return an error to the requesting application indicating that the transaction was not completed successfully, but will be completed later through a recovery process. Since the third phase was skipped, all the resource managers will keep their persistently stored information about the global transaction in case the information is later requested for recovery by the failed resource managers.

Figure 4:
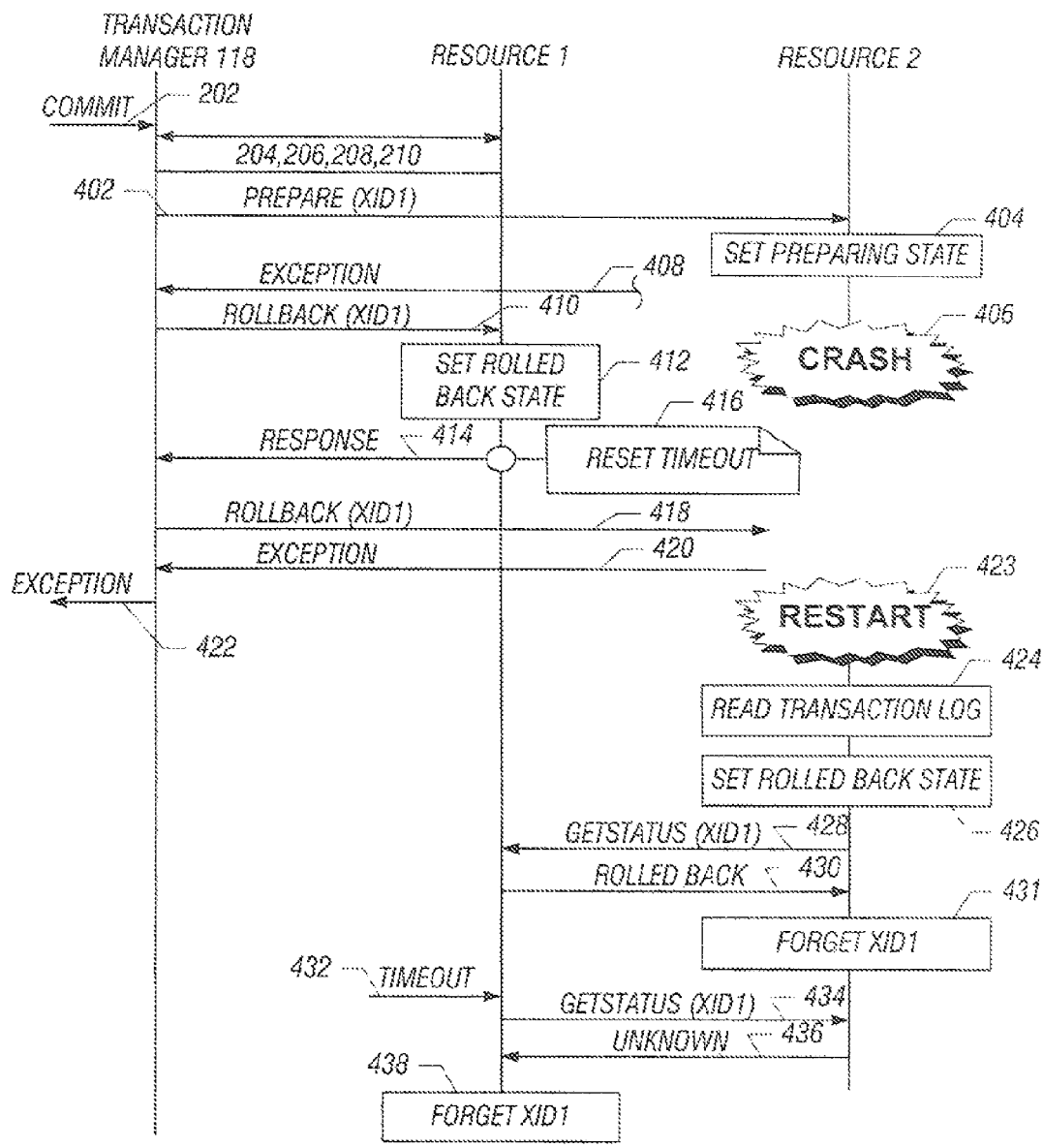
Figure 5:
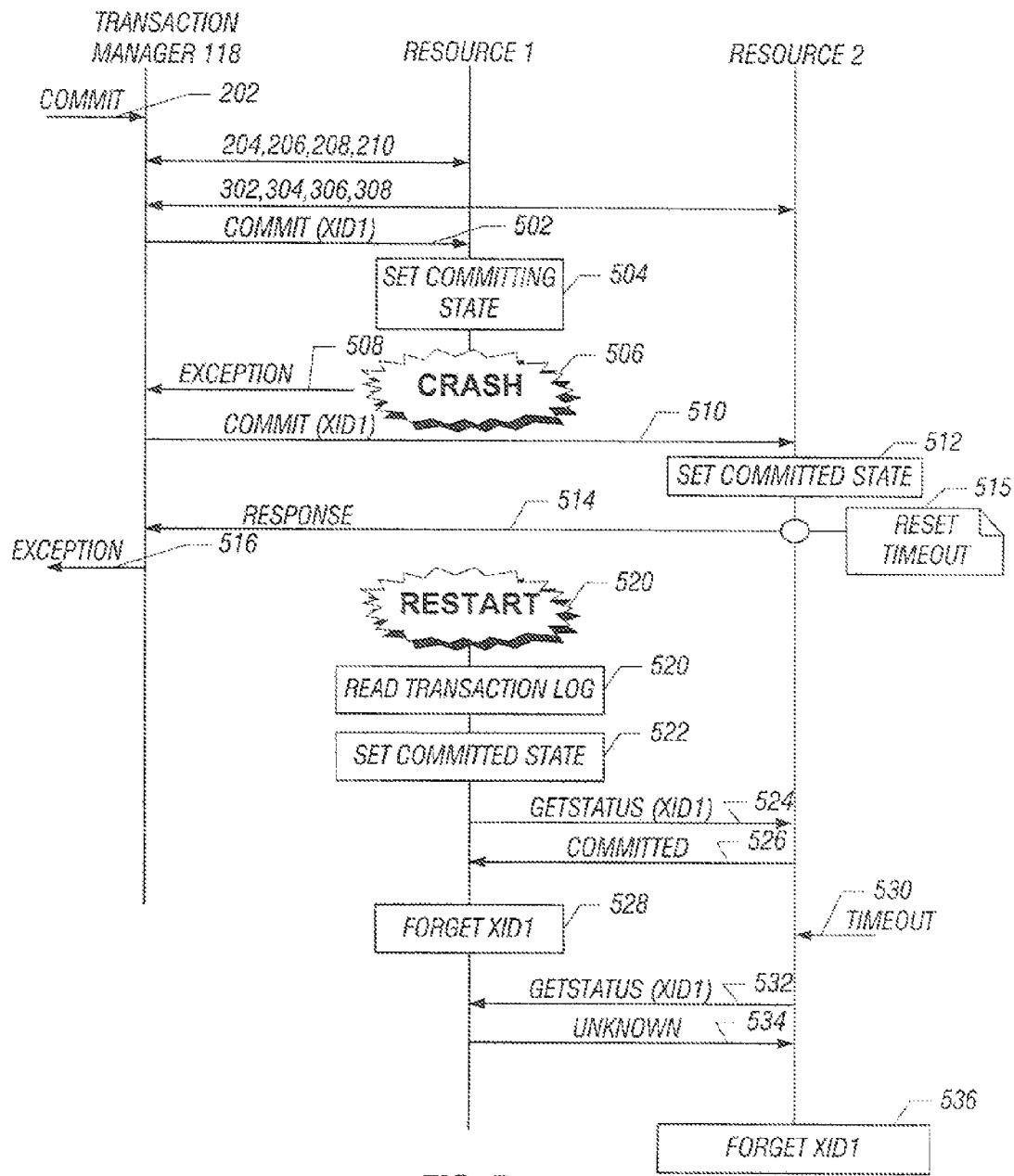
Figure 6:
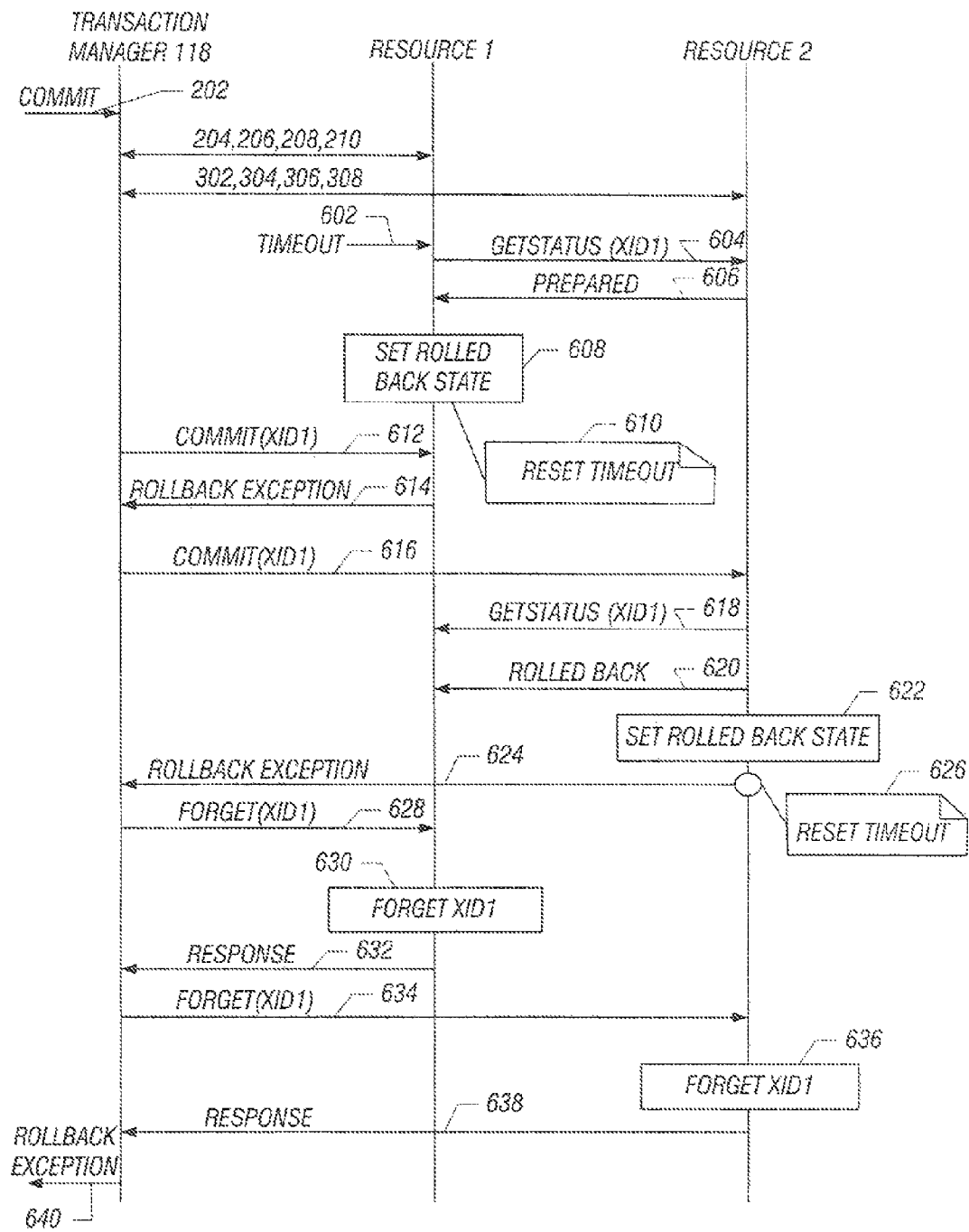

FIGS. 2-6 below depict operations according to several examples, in which the operations are responsive to detection of failure of the transaction manager (FIGS. 2, 3) or failure of a resource manager (FIGS. 4, 5) or network delay (FIG. 6). Note that these flow diagrams are provided as examples. Other exemplary scenarios are possible.

Figure 2:
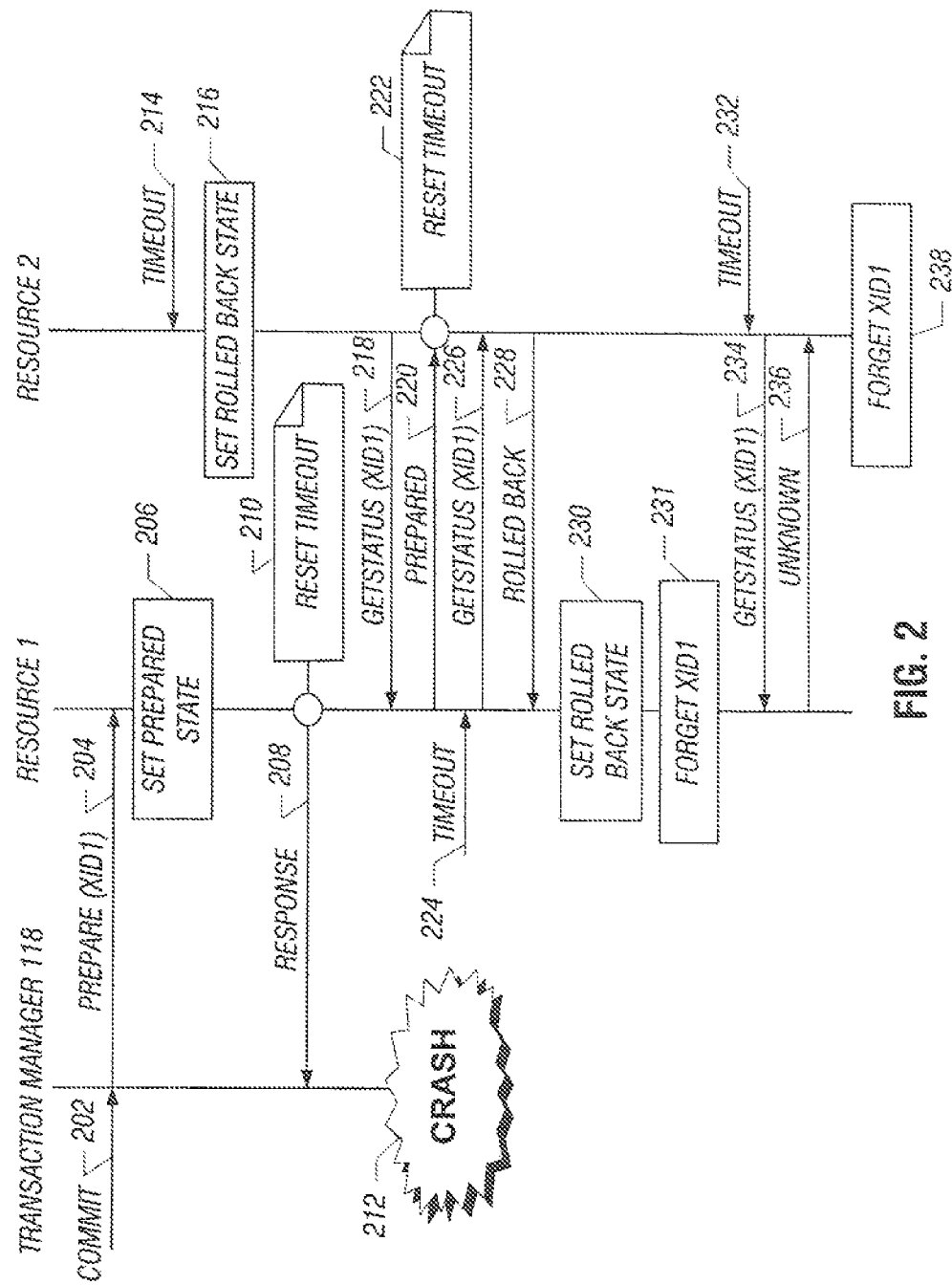
FIGS. 2-6 are message flow diagrams illustrating various exemplary procedures for completing a transaction after failure of a transaction manager or resource manager in the distributed transaction processing system, in accordance with some embodiments.

An exemplary message flow diagram involved the transaction manager 118 and resource entities RESOURCE1 and RESOURCE2 is depicted in FIG. 2 (in the examples discussed here, it is assumed that there are just two resource entities involved in the transaction). Each resource entity includes a resource manager and the corresponding resource (as depicted in FIG. 1). In response to an indication (202) that the transaction (having identifier xid1 in the example) is to be committed, the transaction manager 118 sends a PREPARE (xid1) message to RESOURCE1 (204) to initiate the prepare phase, which causes RESOURCE1 to be set (at 206) into the PREPARED state. Note that in response to a PREPARE message, a resource manager first enters into a PREPARING state (in which the resource manager is starting the process of preparing to commit), followed by a PREPARED state (in which the resource manager is prepared to commit the transaction).

After RESOURCE1 has been set to the PREPARED state, RESOURCE1 returns (208) a response to the transaction manager 118 to indicate that RESOURCE1 has entered the PREPARED state. Also, RESOURCE1 resets (at 210) its timeout, which causes the timeout period to restart counting. The transaction manager 118, at some later point after sending the PREPARE message (204) crashes (at 212).

As a result of the crash of the transaction manager 118, RESOURCE2 does not receive a PREPARE message (such as the PREPARE message sent to RESOURCE1 at 204), and as a result, a timeout occurs (at 214) at RESOURCE2. As a result of the timeout, since RESOURCE2 has not yet prepared the transaction for commit, RESOURCE2 aborts the transaction. Aborting the transaction involves first setting the state of the resource to ROLLING BACK, then undoing the effects of the transaction, then setting (at 216) the state of the resource to ROLLED BACK.

Next, RESOURCE2 sends (at 218) a request message to RESOURCE1 to obtain the status of RESOURCE1 in order to determine if RESOURCE2 call forget about the transaction. In the example of FIG. 2, the request message is referred to as GETSTATUS(xid1), where xid1 is the identifier of the transaction. RESOURCE1 responds with a PREPARED state indication (at 220), which indicates that RESOURCE1 is prepared to commit the transaction. At this point, RESOURCE2 still has to keep all information about the transaction in case RESOURCE1 has to inquire about it. Therefore, RESOURCE2 resets its timeout (at 222) to restart the timeout period to wait for RESOURCE1 to resolve its status (to commit or abort the transaction).

When RESOURCE1 later times out (at 224), RESOURCE1 sends a GETSTATUS(xid1) message (at 226) to RESOURCE2, which responds with a ROLLED BACK state (at 228) to indicate that RESOURCE2 has rolled back (aborted) the transaction. As a result of receiving the indication that RESOURCE2 has rolled back the transaction, RESOURCE1 also does a rollback of the transaction (at 230).

Since RESOURCE2 has already indicated that it has rolled back the transaction, there is no need for RESOURCE1 to keep any information about the transaction, so RESOURCE1 forgets about the transaction (231) after rolling back the transaction (230). Forgetting a transaction means that information maintained persistently by the resource manager about the transaction is deleted.

Upon the next timeout (232) of RESOURCE2, RESOURCE2 sends (at 234) a GETSTATUS(xid1) message to RESOURCE1, which responds (at 236) with an UNKNOWN state, since RESOURCE1 has already forgotten about the transaction. Therefore, RESOURCE2 also forgets about the transaction (238).

Figure 3:
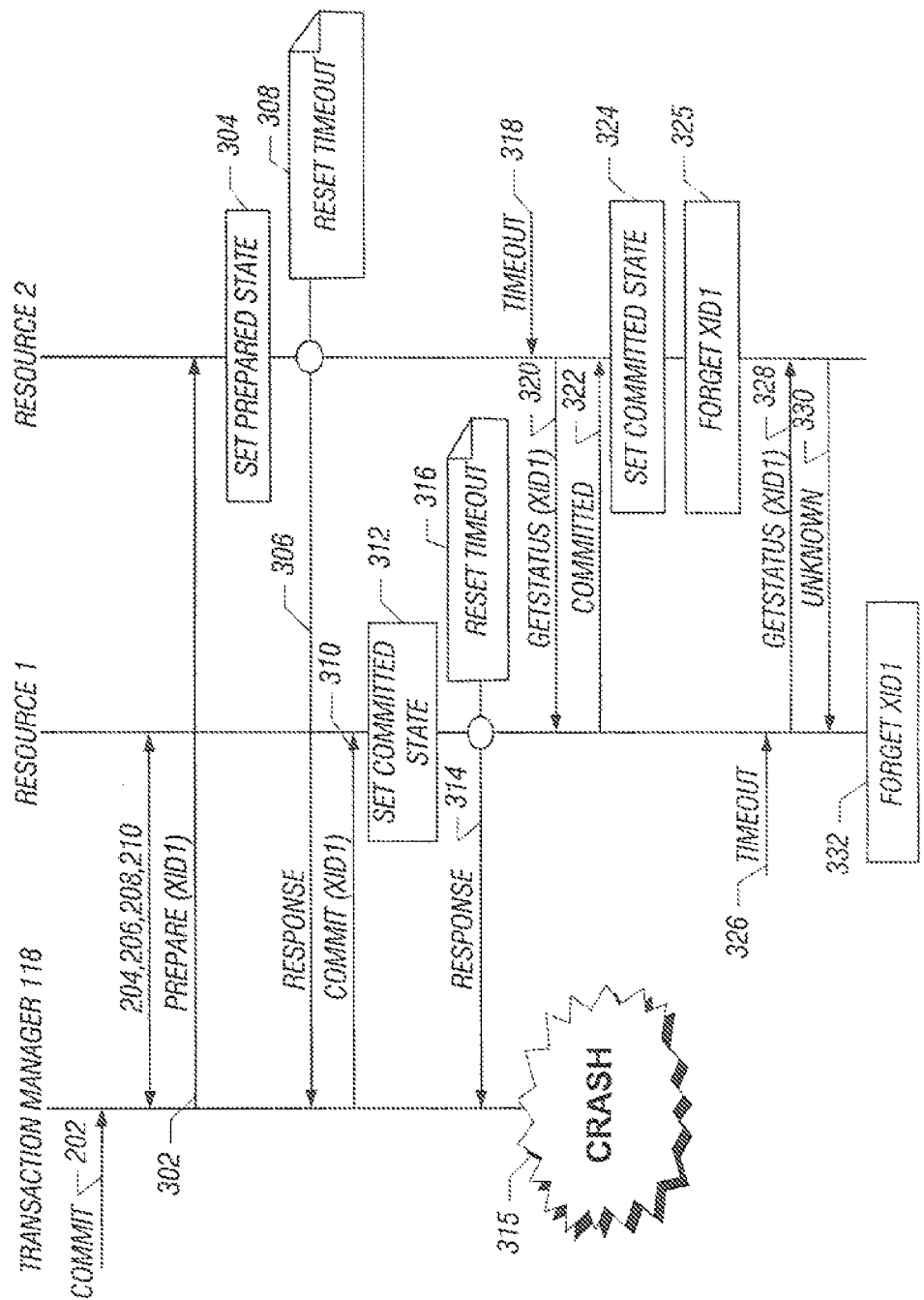

FIG. 3 is an exemplary message flow diagram in which the transaction manager 118 crashes after starting phase 2 (after the transaction manager has sent a COMMIT message to one of the resources to begin the commit phase). Tasks 204 through 210 that are the same as in FIG. 2 are performed in response to the indication (202) to commit. However, in FIG. 3, since the transaction manager 118 does not crash until later, the transaction manager 118 also sends a PREPARE(xid1) message (at 302) to RESOURCE2, which causes RESOURCE2 to be set to the PREPARED state (at 304). RESOURCE2 sends a response (at 306) back to the transaction manager 118 indicating it is in the PREPARED state, and also, RESOURCE2 resets (at 308) its timeout.

Next, the transaction manager 118 begins phase 2, in which the transaction manager sends (at 310) a COMMIT(xid1) message (at 310) to RESOURCE1, to cause the RESOURCE1 to commit the transaction, which involves first setting RESOURCE1 to the COMMITTING state, then making all the transactional changes to RESOURCE1 permanent, and then setting RESOURCE1 to the COMMITTED state (at 312). In response, RESOURCE1 sends a response (at 314) back to the transaction manager 118 to indicate that RESOURCE1 has entered the COMMITTED state. Next, RESOURCE1 resets its timeout (at 316).

At some point after transaction manager 118 has sent the COMMIT message (at 310), the transaction manager 118 crashes (315). As a result, the transaction manager 118 does not initiate the commit phase with RESOURCE2. When RESOURCE2 times out (at 318), RESOURCE2 sends a GETSTATUS(xid1) message (at 320) to RESOURCE1, which returns a response to RESOURCE2 that RESOURCE1 is in the COMMITTED state (at 322). Since RESOURCE2 is in the PREPARED state, and RESOURCE2 detects that the other resource (RESOURCE1) is in the COMMITTED state, RESOURCE2 also commits the transaction and sets (at 324) RESOURCE2 to the COMMITTED state.

Once RESOURCE2 has committed the transaction, RESOURCE2 can forget the transaction (at 325).

However, since RESOURCE1 is not yet sure about the status of RESOURCE2, RESOURCE1 waits for another timeout (at 326), and in response, sends a GETSTATUS(xid1) message (at 328) to RESOURCE2, which responds with a response that indicates that RESOURCE2 has forgotten the transaction (UNKNOWN state) (at 330). As a result, at this point, RESOURCE1 can also forget the transaction (at 332).

In addition to failure of the transaction manager 118, another possible failure is failure of a resource entity 108 (caused either by failure of the resource 106 or the corresponding resource manager 110). Exemplary tasks performed in response to resource entity failure are depicted in FIG. 4. In FIG. 4, it is assumed that RESOURCE2 is the resource that has failed, which occurs soon after RESOURCE2 receives (at 402) a PREPARE message from the transaction manager 118. As depicted in FIG. 4, in response to a commit trigger (202), the tasks 204, 206, 208, and 210 are performed, as in FIG. 2, to place RESOURCE1 in the PREPARED state.

Next, the transaction manager 118 sends (at 402) the PREPARE message (at 402) to RESOURCE2, which causes RESOURCE2 to start preparing for transaction commit, which corresponds to the RESOURCE2 setting itself in the PREPARING state (at 404). However, after RESOURCE2 has entered the PREPARING state, RESOURCE2 crashes (at 406).

Due to loss of connectivity between RESOURCE2 and the transaction manager 118, an exception is returned (at 408) to the transaction manager 118. In response to the exception, the transaction manager 118 sends a ROLLBACK(xid1) message (at 410) to RESOURCE1 to start rolling back the transaction. In response to the ROLLBACK message, RESOURCE1 rolls back the transaction, and sets itself in the ROLLED BACK state (at 412). RESOURCE1 also sends (at 414) a response back to the transaction manager to indicate that it has rolled back the transaction. Also, RESOURCE1 resets its timeout (at 416).

Next, the transaction manager 118 sends a ROLLBACK (xid1) message (at 418) to RESOURCE2. However, since RESOURCE2 has failed, an exception is received (at 420) by the transaction manager 118, which in turn forwards an exception indication (at 422) to the requesting application. This is an indication to the requesting application that the transaction did not end gracefully (neither committed nor rolled back) and that the transaction is in recovery.

At some point, RESOURCE2 may come back and be restarted (at 423). When RESOURCE2 is restarted, RESOURCE2 reads (at 424) its persistent transaction log (which has been kept in persistent storage). From the transaction log, RESOURCE2 detects that its previous state before the crash was the PREPARING state. As a result, RESOURCE2 rolls back the transaction, and sets (at 426) itself to the ROLLED BACK state.

To determine whether or not it can forget the transaction, RESOURCE2 sends a GETSTATUS(xid1) message (at 428) to RESOURCE1, which sends back a response indicating that RESOURCE1 is in the ROLLED BACK state (at 430). At this point, RESOURCE2 can forget the transaction (at 431).

RESOURCE1 next times out (at 432), and in response, sends a GETSTATUS(xid1) message (at 434) to RESOURCE2, which returns an UNKNOWN state, indicating that RESOURCE2 has forgotten the transaction (436).

At this point, RESOURCE1 can forget the transaction (at 438).

FIG. 5 shows an example of a scenario in which RESOURCE1 crashes after the transaction manager has started the commit phase (phase 2), but before full commit has occurred. In response to the indication (202) that transaction commit is to occur, the transaction manager 118 sends prepare calls to RESOURCE1 and RESOURCE2, similar to the flow performed in FIG. 3. As a result, tasks 204, 206, 208, 210, and tasks 302, 304, 306, and 308 are performed with respect to RESOURCE1 and RESOURCE2, respectively. Next, the transaction manager 118 sends (at 502) a COMMIT (xid1) message to RESOURCE1, which causes RESOURCE1 to start performing the commit action. This causes RESOURCE1 to set itself into the COMMITTING state (at 504). In response to a request (COMMIT request) from a transaction manager to perform the commit phase, the resource manager first enters a COMMITTING state (in which the resource manager starts the committing process), followed by entering a COMMITTED state (in which the transaction at the resource has been committed).

In FIG. 5, once RESOURCE1 enters the COMMITTING state, RESOURCE1 crashes (at 506). Due to loss of connectivity, an exception is received (at 508) by the transaction manager 118.

Since the transaction manager 118 has started the commit phase, the transaction manager has to continue the commit phase with RESOURCE2, even though RESOURCE1 failed to commit. The transaction may have been partially committed on RESOURCE1, so rolling back is not an option. It should also be noted that the transaction manager may call the resources within a particular phase in parallel.

As a result, the transaction manager 118 sends (at 510) a COMMIT(xid1) message to RESOURCE2, which commits the transaction and sets itself in the COMMITTED state (at 512). RESOURCE2 then returns a response to the transaction manager 118 indicating that RESOURCE2 has committed the transaction (at 514). RESOURCE2 also resets (at 515) its timeout. Due to the exception received at 508, the transaction manager 118 returns (at 516) an exception to the requesting application.

At some point, RESOURCE1 is restarted (at 518), which causes RESOURCE1 to read its transaction log (at 520) to start the recovery procedure. Since RESOURCE1 has started committing the transaction, RESOURCE1 continues to perform the commit, and sets (at 522) itself to the COMMITTED state. Next, RESOURCE1 sends (at 524) a GETSTATUS (xid1) message to RESOURCE2, which responds with an indication that RESOURCE2 is in the COMMITTED state (at 526). In response to receiving the COMMITTED state indication (at 526) from RESOURCE2, RESOURCE1 forgets the transaction (at 528).

When RESOURCE2 next times out (at 530), RESOURCE2 sends a GETSTATUS(xid1) message (at 532) to RESOURCE1, which responds with a UNKNOWN state (at 534), indicating that RESOURCE1 has already forgotten about the transaction. At this point, RESOURCE2 can forget the transaction (at 536).

FIG. 6 shows an example of a scenario in which RESOURCE1 times out before receiving a commit call from the transaction manager 118 as part of the commit phase (phase 2). This may be due to a slow performance of the transaction manager 118 or the network between the transaction manager 118 and the resources. In response to the indication (202) that transaction commit is to occur, the transaction manager 118 sends prepare calls to RESOURCE1 and RESOURCE2, similar to the flow performed in FIG. 3. As a result, tasks 204, 206, 208, 210, and tasks 302, 304, 306, and 308 are performed with respect to RESOURCE1 and RESOURCE2, respectively. However, due to delay of the transaction manager 118 or the network between the transaction manager and the resource, the COMMIT(xid1) call from the transaction manager (at 612) is delayed to the point where RESOURCE1 first receives a timeout (at 602) before receiving the COMMIT(xid1) call.

Since RESOURCE1 is in PREPARED state, it responds to the timeout (at 602) by requesting the status of the transaction from RESOURCE2 in order to determine whether to commit or abort the transaction (at 604). RESOURCE2 responds indicating that it is also in PREPARED status (at 606). Since all resources are in PREPARED status, RESOURCE1 aborts the transaction and sets its state to ROLLED BACK (at 608).

Sometime after this point, RESOURCE1 receives the COMMIT(xid1) call from the transaction manager 118 (at 612), but since RESOURCE1 has already aborted the transaction, RESOURCE1 returns an exception back to the transaction manager 118 indicating that it has already aborted the transaction (RollbackException) (at 614).

Once a transaction manager makes a commit decision for the second phase of the two-phase commit, the transaction manager has to call each of the resources with the same commit call. It should also be noted that the transaction manager may call the resources within a particular phase in parallel.

In response to receiving the RollbackException, the transaction manager 118 sends (at 616) a COMMIT(xid1) message to RESOURCE2. However, since RESOURCE2 was previously contacted by RESOURCE1 concerning the status of the transaction. RESOURCE2 has to verify what action RESOURCE1 has already taken. Therefore, RESOURCE2 calls RESOURCE1 with a GETSTATUS(xid1) call (at 618), which responds with an indication that RESOURCE1 is in the ROLLED BACK state (at 620). In response to receiving the ROLLED BACK state indication (at 620) from RESOURCE1, RESOURCE2 overrides the directive to commit from the transaction manager 118, and aborts the transaction instead, setting itself to the ROLLED BACK state (at 622). It also responses back to the transaction manager 118 (at 624) with an exception indicating that the transaction was aborted rather than committed. RESOURCE2 also resets (at 626) its timeout.

Since all the resources completed the second phase of the two-phase commit (even though the decision of the resources was to abort the transaction rather than commit), the transaction manager 118 now moves on to the third phase, or cleanup phase where it makes FORGET(xid1) calls to RESOURCE1 (at 628) and RESOURCE2 (at 634). Both RESOURCE1 and RESOURCE2 forget about the transaction, removing any information about the transaction from their persistant stores (at 630 and 636, respectively) and responds back to the transaction manager 118 to indicate that the FORGET(xid1) calls are completed (at 632 and 638, respectively).

Finally, the transaction manager 118 sends an exception back to the application indicating that the transaction was aborted rather than committed (at 640).

Instructions of software described above (including the transaction manager 118 and resource managers 10 of FIG. 1) are loaded for execution on a processor (such as one or more processors 112 in FIG. 1). Each processor includes a microprocessor, microcontroller, processor module or subsystem (including one or more microprocessors or microcontrollers), or other control or computing devices. As used here, a "processor" refers to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A distributed transaction processing system comprising:
    a plurality of resources;
    resource managers to manage corresponding ones of the resources;
    a transaction manager to coordinate performance of a transaction with the resource managers,
    wherein in response to failure of the transaction manager, the resource managers are configured to collaborate to decide whether to commit or abort the transaction, wherein the collaborating comprises at least two of the resource managers communicating with each other, where the communicating includes a first of the at least two resource managers sending a first request to a second of the at least two resource managers to obtain a state of the transaction at the second resource manager, and the second resource manager sending a second request to the first resource manager to obtain a state of the transaction at the first resource manager; and
    one or more processors, wherein the resource managers and transaction manager are executable on the one or more processors.

2. The distributed transaction processing system of claim 1, wherein, in response to failure of the transaction manager, each of the resource managers is to:
    handle recovery and completion of the transaction with respect to the corresponding resource that the resource manager is managing.

3. The distributed transaction processing system of claim 2, wherein the first resource manager that has completed preparing the transaction but has not started either committing or aborting the transaction, is configured to:
    commit or abort the transaction at the first resource manager according to the determined state of the transaction at the second resource manager obtained in response to the first request.

4. The distributed transaction processing system of claim 3, wherein the first resource manager is configured to:
    commit the transaction in response to determining that the second resource manager has started to commit or has committed the transaction.

5. The distributed transaction processing system of claim 3, wherein the first resource manager is configured to:
    abort the transaction in response to determining that the second resource manager (1) has started to abort or aborted the transaction; or (2) has not finished preparing the transaction.

6. The distributed transaction processing system of claim 3, wherein the first resource manager is configured to:
    abort the transaction in response to determining that all the other resource managers are in a prepared state for the transaction.

7. The distributed transaction processing system of claim 2, wherein each resource manager is configured to:
    abort the transaction if the resource manager has not yet finished preparing the transaction for commit;
    finish committing the transaction if the resource manager has already started committing the transaction;
    finish aborting the transaction if the resource manager has already started aborting the transaction.

8. The distributed transaction processing system of claim 1, further comprising a persistent storage to store persistent information of the transaction for each of the resource managers.

9. The distributed transaction processing system of claim 8, wherein a particular one of the resource managers is configured to delete the respective persistent information of the transaction in response to determining that all of the other resource managers have already committed or aborted the transaction, and therefore will no longer require the corresponding persistent information for recovery purposes.

10. The distributed transaction processing system of claim 1, wherein the resource managers detect failure of the transaction manager based on a timeout condition, wherein a recovery process is to be started in response to the timeout condition, the recovery process comprising the resource managers collaborating to decide whether to commit or abort the transaction.

11. The distributed transaction processing system of claim 1, wherein failure of the transaction manager comprises either (1) the transaction manager crashing or (2) loss of communication with the transaction manager.

12. The distributed transaction processing system of claim 1, wherein the transaction manager is to communicate identities of the resource managers involved in the transaction to each of the resource managers involved in the transaction, wherein the collaborating uses the identities.

13. A method for use in a distributed transaction processing system, comprising:
    providing resource managers to manage respective resources of the distributed transaction processing system;
    providing a transaction manager to coordinate performance of a transaction with the resource managers;
    configuring the resource managers with respective timeout conditions to cause the resource managers to timeout in response to failure of the transaction manager or any of the resource managers involved in the transaction; and
    collaborating, by the resource managers involved in the transaction that are executing on one or more processors, to complete the transaction based upon timeouts of the resource managers, wherein the collaborating comprises at least two of the resource managers sending requests to each other regarding a state of the transaction.

14. The method of claim 13, wherein a particular one of the plural resource managers has completed preparing the transaction but has not started either committing or aborting the transaction, the method further comprising:

receiving a state of the transaction for at least one other of the resource managers in response to the request sent by the particular resource manager;

the particular resource manager committing or aborting the transaction according to the state of the transaction of the at least one other resource manager.

15. The method of claim 14, further comprising:

the particular resource manager committing the transaction in response to determining that the at least one other resource manager has started to commit or has committed the transaction; and the particular resource manager aborting the transaction in response to determining that the at least one other resource manager (1) has started to abort or aborted the transaction; or (2) has not finished preparing the transaction.

16. The method of claim 13, further comprising the transaction manager communicating the timeout conditions to the corresponding resource managers.

17. An article comprising at least one non-transitory computer-readable storage medium containing instructions that when executed cause a system having a processor to:

run resource managers to manage respective resources;

coordinate, by a transaction manager, performance of a transaction that involves plural resource managers;

detect failure of the transaction manager; and in response to detecting failure of the transaction manager, send requests by the plural resource managers to each other to obtain states of the transaction at the corresponding resource managers to complete the transaction.

18. The article of claim 17, wherein a particular one of the lbural resource managers has completed preparing the transaction but has not started either committing or aborting the transaction, wherein the instructions when executed cause the system to:

receive, by the particular resource manager, a state of the transaction for at least one other of the plural resource managers in response to the request sent by the particular resource manager; and commit or abort the transaction at the particular resource manager according to the state of the transaction for the at least one other resource manager.

19. The article of claim 18, wherein the instructions when executed cause the system to further:

commit, at the particular resource manager, the transaction in response to determining that the at least one other resource manager has started to commit or has committed the transaction.

20. The article of claim 18, wherein the instructions when executed cause the system to further:

abort, at the particular resource manager, the transaction in response to determining that the at least one other resource manager (1) has started to abort or aborted the transaction; or (2) has not finished preparing the transaction.

* * * * *

UNITED STATES PATENT AND TRADEMARK OFFICE
CERTIFICATE OF CORRECTION

| | | |
|---|---|---|
| PATENT NO. | : 8,650,272 B2 | Page 1 of 1 |
| APPLICATION NO. | : 12/238779 | |
| DATED | : February 11, 2014 | |
| INVENTOR(S) | : Douglas B. Myers | |

It is certified that error appears in the above-identified patent and that said Letters Patent is hereby corrected as shown below:

In the Claims

In column 14, line 5, in Claim 18, delete "lbural" and insert -- plural --, therefor.

Signed and Sealed this
Twenty-seventh Day of May, 2014

Michelle K. Lee
*Deputy Director of the United States Patent and Trademark Office*